(No Model.)

J. C. PETIT.
WOMB BATTERY.

No. 520,895.  Patented June 5, 1894.

Witnesses:

Inventor
J. C. Petit
By James J. Sheehy
Attorney

United States Patent Office.

JULIUS C. PETIT, OF FORT WORTH, TEXAS.

WOMB-BATTERY.

SPECIFICATION forming part of Letters Patent No. 520,895, dated June 5, 1894.

Application filed April 10, 1894. Serial No. 507,051. (No model.)

*To all whom it may concern:*

Be it known that I, JULIUS C. PETIT, a citizen of the United States, residing at Fort Worth, in the county of Tarrant and State of Texas, have invented certain new and useful Improvements in Womb-Batteries; and I do declare the following to be a full, clear, and exact description of the invention, such as will enable others skilled in the art to which it appertains to make and use the same.

My invention relates to electrical therapeutics; and it has for its general object to provide an advantageous electrical or galvanic device adapted, when placed in the womb of a patient where it will be subject to the chemical action of the mucous fluid, to develop a mild electric action and thereby stimulate the generative organs and promote the cure of the various diseases peculiar to the female sex.

Another object of the invention is to provide an electrical or galvanic device for the purpose stated, embodying such a construction that it will not be liable to casual displacement when properly placed in its operative position.

Still another object is to provide a very cheap and simple implement through the medium of which the electrical device may be readily adjusted to its proper position and as readily removed when desired.

With the foregoing ends in view the invention will be fully understood from the following description and claims when taken in connection with the accompanying drawings, in which—

Figure 1:
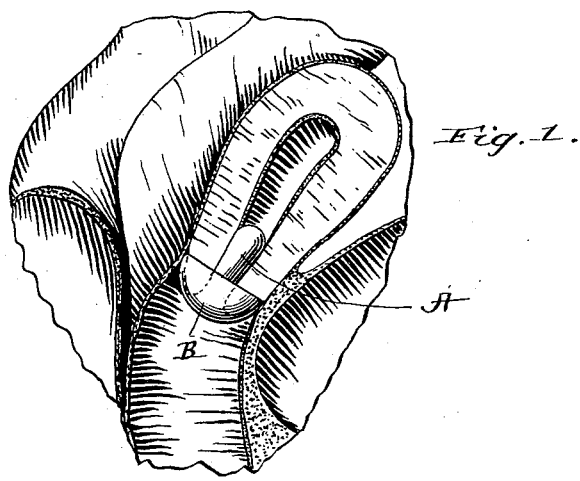
Figure 2:
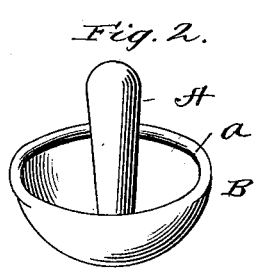
Figure 3:
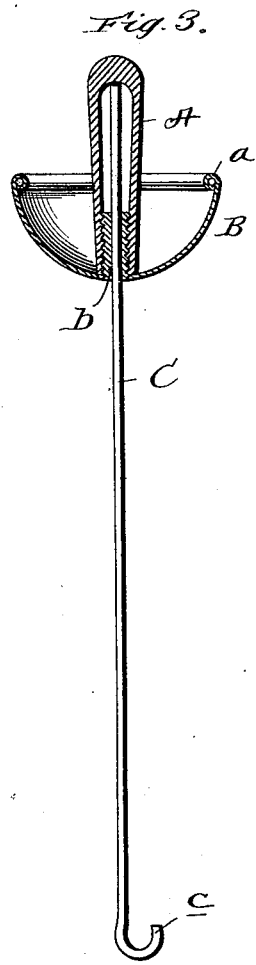

Figure 1 is a view illustrating my improved device in its operative position. Fig. 2, is a perspective view of the device, removed. Fig. 3 is a diametrical section of the device with my improved implement in position to adjust the device to its operative position, and Fig. 4, is a perspective view of the implement.

In the said drawings similar letters designate corresponding parts throughout the several views referring to which—

A, indicates the stem of my improved device which is designed to rest in the neck of the womb as shown in Fig. 1, and B, indicates the body. This body B, is preferably of the cup shape illustrated in order to enable it to receive and engage the mouth of the womb; and it has its edge turned as shown at $a$, so as to present only smooth, broad surfaces to the womb, and is provided with the central, hollow shank $b$, which is exteriorly threaded for the engagement of the hollow and interiorly threaded stem A. The stem A, and the shank $b$, are hollow in order to receive the adjusting implement as shown in Fig. 3; and the said stem which is of the form or approximate form illustrated, is composed of a metal or substance which is either positive or negative to the metal or substance composing the body B, whereby it will be seen that when the device is placed in the womb, where the body and stem will be subject to the chemical action of the mucous fluid, said body and stem will develop a mild though pronounced electric action. This electric action by stimulating the genitals will enable them to perform their proper functions and will consequently regulate menstruation and promote the cure of the many diseases peculiar to the female.

Figure 4:

In order to enable a patient to readily adjust the electric or galvanic device to its operative position and as readily remove the same, I provide the implement C, better illustrated in Fig. 4. This implement C, may be and preferably is formed from wire, and it is straight for the major portion of its length and is provided at one end with a hook as $c$, which is designed to engage the edge of the body B, so as to enable the patient to readily remove the device when desired.

To adjust the device to its operative position, it is simply necessary to introduce the index finger of the left hand to the womb and with the implement C, inserted in the device as shown in Fig. 3, press the device up gently until the stem enters the womb and the body engages the mouth thereof, when the air being naturally exhausted from the disk it will retain its position and will not be liable to casual displacement. To remove the device it is simply necessary for the patient to pass the hooked end of the implement up the vagina and engage it with the edge of the body B, when the device may be displaced by drawing the implement gently outward.

Having described my invention, what I claim, and desire to secure by Letters Patent, is—

1. The herein described electrical device for the treatment of diseases of the womb, comprising a body and a stem; the said stem being composed of a metal either positive or negative to the metal of which the body is composed, substantially as and for the purpose set forth.

2. An electrical device for the treatment of diseases of the womb, comprising a cup shaped body having its edge turned and also having a central, hollow and exteriorly threaded shank, and a hollow, interiorly-threaded stem engaging the shank of the body; the said stem being composed of a metal either positive or negative to the metal of which the body is composed, substantially as specified.

3. The combination with an electrical device comprising a body having a hollow shank and a hollow stem connected to said shank; of the adjusting implement C, having a hook at one end, substantially as and for the purpose set forth.

In testimony whereof I affix my signature in presence of two witnesses.

JULIUS C. PETIT.

Witnesses:
M. E. STEWART,
E. E. M. COCHRAN.